US009501538B2

(12) United States Patent
Wuchner

(10) Patent No.: US 9,501,538 B2
(45) Date of Patent: Nov. 22, 2016

(54) MANAGEMENT APPARATUS AND METHOD FOR MANAGING DATA ELEMENTS

(71) Applicant: Egon Wuchner, Biessenhofen (DE)

(72) Inventor: Egon Wuchner, Biessenhofen (DE)

(73) Assignee: Siemens Aktiengesellschaft, München (DE)

(*) Notice: Subject to any disclaimer, the term of this patent is extended or adjusted under 35 U.S.C. 154(b) by 248 days.

(21) Appl. No.: 14/160,551

(22) Filed: Jan. 21, 2014

(65) Prior Publication Data

US 2014/0207829 A1 Jul. 24, 2014

(30) Foreign Application Priority Data

Jan. 22, 2013 (EP) ..................................... 13152115
Jul. 8, 2013 (EP) ..................................... 13175527

(51) Int. Cl.
*G06F 17/30* (2006.01)
*G06F 9/44* (2006.01)

(52) U.S. Cl.
CPC ............. *G06F 17/3056* (2013.01); *G06F 8/71* (2013.01)

(58) Field of Classification Search
CPC .................................................. G06F 17/3056
USPC ................................ 707/804, 722, 723, 758
See application file for complete search history.

(56) References Cited

U.S. PATENT DOCUMENTS

| | | | | |
|---|---|---|---|---|
| 4,931,928 A | * | 6/1990 | Greenfeld | G06F 8/427 707/999.003 |
| 6,321,201 B1 | * | 11/2001 | Dahl | G06F 21/6218 705/51 |
| 6,408,292 B1 | * | 6/2002 | Bakalash | G06F 17/30489 |
| 8,868,580 B2 | * | 10/2014 | Gould | G06F 17/30466 707/758 |
| 2002/0156799 A1 | * | 10/2002 | Markel | G06F 17/3089 |
| 2005/0278354 A1 | * | 12/2005 | Gupta | H04L 67/125 |
| 2008/0244205 A1 | * | 10/2008 | Amano | G06F 11/1451 711/162 |
| 2009/0070337 A1 | * | 3/2009 | Romem | G06F 17/30575 |
| 2009/0177721 A1 | * | 7/2009 | Mimatsu | H04L 67/1097 |
| 2010/0031237 A1 | | 2/2010 | Zlotnick | |
| 2012/0215768 A1 | * | 8/2012 | Zellweger | G06F 17/30392 707/722 |
| 2012/0254162 A1 | * | 10/2012 | Asadullah | G06F 17/30657 707/723 |

OTHER PUBLICATIONS

Extended European Search Report from European Patent Application No. 13175527.4, Jan. 28, 2014.
T.M. Mitchell, "Evaluating Hypothesis," Machine Learning, McGraw-Hill, pp. 128-153, 1997.
T. Zimmermann, et al., "Mining Version Histories to Guide Software Changes," IEEE Transactions on Software Engineering, pp. 429-445, Jan. 1, 2005.
European Search Report for related European Application No. 13 175 527.4-1954, dated Apr. 20, 2016.

* cited by examiner

*Primary Examiner* — Noosha Arjomandi
(74) *Attorney, Agent, or Firm* — Lempia Summerfield Katz LLC

(57) ABSTRACT

An apparatus and a method for identifying relationships between data elements stored in a storage system are provided. A common check-in procedure of related data elements is analyzed, and an additional database is provided for storing information of data elements that have been checked-in together. Based on an analysis of information stored in the additional database, an indication may be automatically generated and provided to a user in order to give a hint for related data elements.

26 Claims, 2 Drawing Sheets

MANAGEMENT APPARATUS AND METHOD FOR MANAGING DATA ELEMENTS

This application claims the benefit of EP 13152115, filed on Jan. 22, 2013, and EP 13175527, filed on Jul. 8, 2013, which are hereby incorporated by reference in their entirety.

BACKGROUND

The present embodiments relate to a management apparatus and method for managing data elements.

In order to handle complex software systems, an entity of a software system may be separated into a plurality of parts of the code base. This simplifies the development and the maintenance of a complex software system. The software system may be developed by a plurality of users. For this purpose, the individual parts of the code base of the software system are stored and managed by a central storage and management system. When a user wants to work on the code base, the required files of the code base are copied from a central storage system to a local user terminal. After the user has finished work, the modified parts of the code base are transferred back to the central storage system, and the modified parts of the code base are stored in the central storage system. This procedure is called "check-in". In order to enable a tracking of the software development and to monitor the modifications, the received parts of the code base may be stored in addition to the previous version of the respective parts or sections of the code base. Thus, the amendments may be identified, and a previous version may be recovered if the current amendments lead to a serious error in the code base. In a conventional configuration management system (CMS), code parts are stored based on directories and/or files.

Since the code base of complex software may include a huge number of individual data elements, the user is confronted with a large number of mainly unstructured information when maintaining and evolving the software system. For example, it is difficult to analyze the impact of a change on further parts of the code base. It is hard to realize what other parts of the code base are to be considered in order to keep the system function running according to operational qualities.

Conventionally, compile and link errors indicate which additional changes are also needed on other parts of the code base when implementing a change to the code base. However, there are no hints on a possible semantic relationship between different parts of the code base that are to be considered when changing the code.

Accordingly, when modifying a part of the code base, a user is not aware which other parts of the code base are also to be considered when performing a change, or which other parts of the code base may be semantically related to the currently modified part. Further, the user has no information how the currently performed change affects other functional parts of the software.

Semantic relationships between different parts of the code base may hardly be resolved by analyzing compile and link errors. Additionally, the users may include some hints on semantically needed changes by adding source code comments.

SUMMARY AND DESCRIPTION

The scope of the present invention is defined solely by the appended claims and is not affected to any degree by the statements within this summary.

There is a need for an apparatus and a method for managing elements of a code base of a software system identifying related elements of the code base. There is also a need for enhanced managing of elements of the code base in order to automatically identify relationships between elements of the code base. The present embodiments may obviate one or more of the drawbacks or limitations in the related art. For example, the need described above may be met by the present embodiments.

According to a first aspect, a management apparatus for managing a plurality of data elements of a code base of a software system is provided. The management apparatus includes a receiver configured to receive a plurality of data elements. The management apparatus also includes a memory configured to store the received data elements. The management apparatus includes a database configured to record link data specifying data elements that have been received together by the receiver. The management apparatus includes a requesting device configured to receive a request for reading a requested data element being stored in the memory. The management apparatus includes an identifying device configured to identify a further data element related with the requested data element based on the link data stored in the data base. The requesting device and the identifying device may be formed by one or more processors.

According to another aspect, a method for managing a plurality of data elements of a code base of a software system is provided. The method includes receiving a plurality of data elements, storing the plurality of received data elements in a memory, and recording link data in a database. The link data specifies data elements that have been received together. The method also includes receiving a request for reading a requested data element stored in the memory, and identifying a further data element related with the requested data element based on link data stored in the database.

Which parts of the software code are modified at the same time and are stored together in a central storage system is analyzed. Data elements that are stored together in the central storage system are considered to be related. Thus, information about the storing processes (e.g., information identifying data elements that are stored together) is stored in an additional database.

When a user requests a data element stored in a central storage system, related data elements may be identified based on the information stored in the additional database. Accordingly, this information about the related data elements may be provided to the user when requesting a data element from the storage system. In this way, the user may also consider the additionally identified data elements in order to perform additional amendments on the further identified data elements.

The user is automatically provided with additional information about related data elements when the user starts working on a data element. Thus, related parts of a code base may be identified and adapted accordingly if necessary. In this way, the time for adapting or modifying the code base may be reduced, and errors due to an incomplete modification of the code base may be avoided.

According to an embodiment, the database further records an indication specifying the data elements that have been received together.

Based on such an indication, related data elements may be identified automatically in an efficient manner.

According to a further embodiment, the database further records a time stamp of each data element received by the receiver.

By assigning such a time stamp to link data of the received data element, the recorded data in the database may be easily delimited to a particular time period.

According to a further embodiment, the identification device further includes a computing device (e.g., a processor) for calculating statistical values indicating the relationship between the data elements stored in the memory based on the link data recorded in a database. The identification device identifies the further data element based on the computed statistical value.

By analyzing a statistical value between related data elements, a reliable value for a relationship between individual data elements may be determined.

According to a further embodiment, the apparatus further includes a messaging device configured to provide an indication of the identified further data element.

In this way, a user may be notified about further related data elements, and the user may decide whether or not to consider the identified further data elements when performing changes on the requested data element.

In a further embodiment, the method for managing the data elements further includes calculating a statistical value indicating a relationship between the data elements stored in the memory based on the link data recorded in the database. The identifying includes at least one further data element based on the computed statistical value.

In one embodiment, the statistical value is a frequency value of commonly received data elements.

Such a frequency value is a good indication for determining a relationship between individual data elements.

In one embodiment, the identifying includes identifying the further data element if the computed frequency value between the requested data element and the further data element exceeds a predetermined threshold value.

By defining a predetermined threshold value, the reliability of determining related data elements may be improved.

In a further embodiment, the identifying includes identifying the at least one further data element if the computed correlation value is within a predetermined confidence interval.

In this way, a reliable identification of related data elements may be achieved.

According to a further embodiment, the identifying includes identifying the further data element based on the link data relating to a predetermined number of previous and/or next storing operations of received data elements.

By limiting the analysis of the related data elements to a predetermined number of previous storing operations, modifications in the code base leading to a change in the relationship between the individual data elements may be acknowledged.

According to a further embodiment, the identifying includes identifying the further data element based on link data relating to a storing of received data elements within a predetermined time period.

In this way, the reliability of the automatically determination of related data elements may also be improved.

According to a further embodiment, the data elements include a set of Files, Directories, Sub-Directories, Namespaces, Classes or Class methods/functions.

One or more of the present embodiments include a data storage and management system including a management apparatus. The data storage and management system also includes a user terminal configured to send data elements to the management apparatus and to receive data elements from the management apparatus upon request.

Further, one or more of the present embodiments include a computer product (e.g., stored in a non-transitory computer-readable storage medium) to perform a method, as discussed above and below.

DETAILED DESCRIPTION

Figure 1:
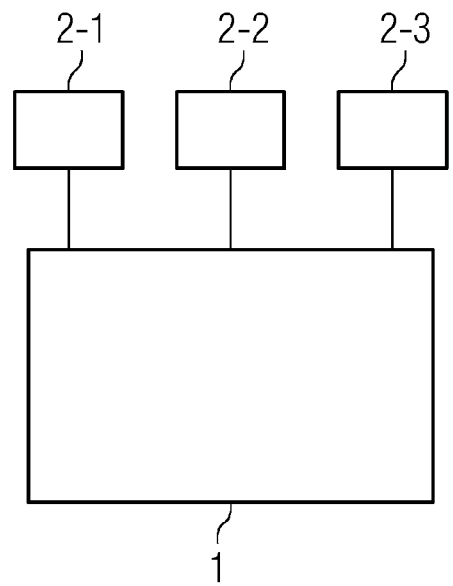
FIG. 1 shows a storage and management system for code base of a software system according to an exemplary embodiment.

FIG. 1 shows one embodiment of a data storage and management system for managing a code base of a software system. The code base of the software system may be, for example, source code of a software project.

The data storage and management system includes a management apparatus 1 and a plurality of user terminals 2-$i$. Each user terminal 2-$i$ of the plurality of user terminals 2-I may be a workplace of a user including a local computer (e.g., a PC, a notebook, a workstation etc.). The management apparatus 1 includes a storage system for storing the complete code base of the software system. When a user wants to work on this code base, the required files of the code base are copied from the management apparatus 1 to a terminal 2-$i$ of the respective user. After the user has finished work and modified the parts of the code base on the local terminal 2-$i$ of the user, the modified parts of the code base are transferred to the management apparatus 1, and a check-in of the modified parts of the code base is performed on the management apparatus 1. In this check-in procedure, the received parts of the code base are stored in a central storage system of the management apparatus 1. In order to enable a tracking of software development and to monitor the modifications, the received parts of the code base may be stored in addition to the previous version of the respective parts of the code base. Thus, the amendments may be identified, and a previous version may be recovered if the current amendments would lead to a serious error in the code base. In a conventional configuration management system (CMS), code parts are stored based on directories and/or files. After this check-in procedure, the modified parts of the code base become valid elements of the software system.

Depending on the complexity and the size of the software system, the individual parts of the code base may be a construct on different granularity levels. A course-granular set of constructs are architectural modules like a set of files or a set of all directories, sub-directories or namespaces of the software code base. A fine granular set of design constructs may be a set of classes or the set of all class methods/functions depending on the programming language.

Figure 2:
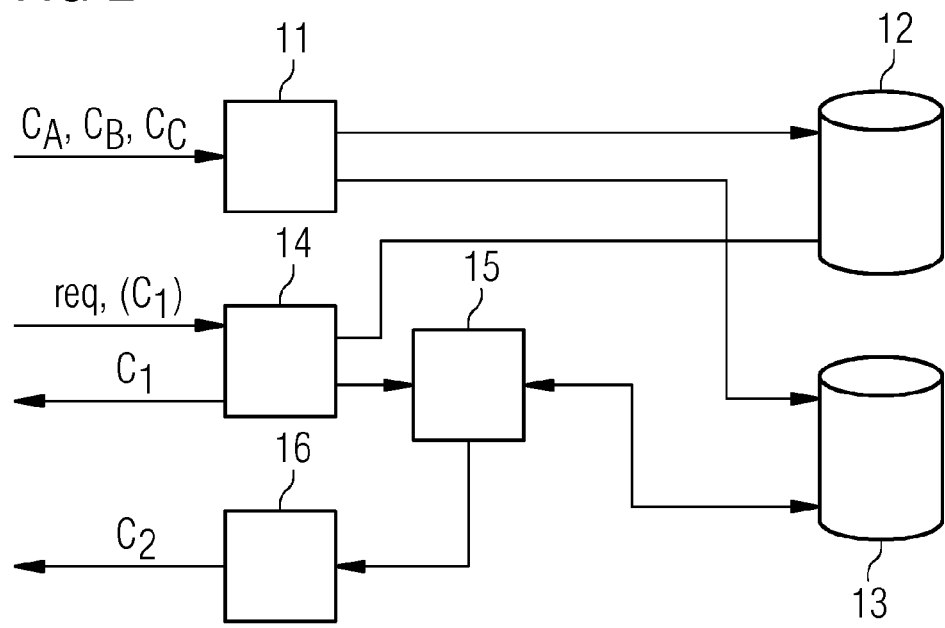
FIG. 2 shows a management apparatus according to a further exemplary embodiment.

FIG. 2 illustrates one embodiment of a management apparatus 1 for managing the constructs of a software code base in more detail. All parts (e.g., constructs) of the code base of the software system are stored in a memory 12. After a user has modified some of these constructs $C_A$, $C_B$ and $C_C$, these constructs $C_A$, $C_B$ and $C_C$ are transferred from the user terminal 2-$i$ to the management apparatus 1 and received by receiving device 11 (e.g., a receiver) of the management apparatus 1. In order to perform a check-in of the received constructs $C_A$, $C_B$ and $C_C$, the received constructs $C_A$, $C_B$ and $C_C$ are stored in the memory 12. Additionally, the receiver 11 recognizes that a plurality of constructs $C_A$, $C_B$ and $C_C$ are received together. For example, the constructs $C_A$, $C_B$ and $C_C$ are received by the receiver 11 almost at the same time from the same user terminal 2-i, and a common check-in of these constructs $C_A$, $C_B$ and $C_C$ is performed. Accordingly, information about the reception of the received constructs $C_A$, $C_B$ and $C_C$ is generated and stored as linked data in the database 13.

In order to perform the analysis of the individual code parts on a basis that is different from the granularity level used for storing the code parts in the memory 12 of the management apparatus, additional information may be generated specifying the code base on a finer granularity level. This additional information may be stored together with the parts of the individual code base or in an additional memory (not shown).

When analyzing the received constructs in the receiver 11 of the management apparatus 1, all constructs relating to a common check-in procedure may be considered as constructs that have been received together. In one embodiment, an additional identifier is attached to each construct. This identifier may indicate that a construct belongs to a predetermined check-in procedure. Alternative methods for specifying that a plurality of constructs relate to a common check-in procedure may also be provided.

According to a further implementation, the receiver 11 of the management apparatus 1 may determine that the received constructs are received together if the constructs are received within a predetermined time period. For example, a timer is started when receiving a first construct. All constructs being received during a time period (e.g., milliseconds, seconds or minutes) are considered to be received together. Alternatively, constructs are considered to be received together if the constructs are received subsequently, and a time period between the end of the reception of a construct and the start of a reception of a subsequent construct is less than a predetermined time period. Otherwise, if the time period between the end of a reception of a construct and the start of a reception of the subsequently received construct is lager than the predetermined threshold, the subsequently received construct is not considered to be received together with the previously received construct.

Constructs may only be considered to be received together by the receiver 11 of the management apparatus 1 if the constructs are sent from the same user and/or from the same user terminal 2-1. If the constructs are transmitted via a TCP/IP network, the constructs that are considered to be received together by the receiver 11 of the management apparatus 1 may be limited to constructs that are sent from the same IP-address.

In an alternative implementation, the analysis of the modification is performed independent of the reception by the receiver 11. For this purpose, the received constructs are stored in the memory 12 upon reception by the receiver 11 of the management apparatus 1. Afterwards, the code base of the software system stored in memory 12 of management apparatus 1 is analyzed in order to identify constructs that have been received together. For example, an analyzing device (not shown) performs an analysis of the code base in order to determine the constructs that have been checked-in within a predetermined time period. Alternatively, additional information may be recorded, specifying the relationship of a construct to a particular storage process.

If a further modification of the code base is to be performed, a request req(C1) for at least one construct C1 is sent from a user terminal 2-i to requesting device 14 of the management apparatus 1. Requesting device 14 receives the request req(C1) for reading the requested construct C1. Based on this request req(C1), the requested construct C1 is read out from the memory 12 and transferred to the requesting user terminal 2-i.

Additionally, information about the request construct C1 is forwarded to identifying device 15 of the management apparatus 1. The identifying device 15 refers to the database 13 in order to analyze which further constructs have been stored together with the requested construct C1 in previous check-in procedures. For this purpose, identifying device 15 may consider all previous check-in procedures and identify all further constructs that have been checked-in together with the requested construct C1 during the whole lifetime of the software system.

Alternatively, identifying device 15 may limit the analysis of previous check-in procedures to a predetermined number of check-in procedures or to the check-in procedure within a predetermined time period. In this way, the analysis may be further improved, and a change of the dependencies during modifications of the constructs may be considered.

In order to identify further constructs C2 related to the requested construct C1, the identifying device 15 may determine a frequency of common changes of two constructs C1 and C2. For this purpose, a statistical value may be computed specifying a frequency f(C1, C2) over all check-in procedures related to the requested construct C1. This frequency value leads to a value in the range of 0 and 1. A higher value may indicate a strong relationship between two considered constructs C1 and C2. If the statistical value determined by identifying device 15 exceeds a predetermined threshold value (e.g., 0.4), the further construct C2 is considered to have a high potential semantic relation to the requested construct C1. In this case, a requesting user is notified about the identified further construct C2, and the user may also work on the further construct C2 when modifying the request construct C1. Such a modification may be sent to a user (e.g., by notification device 16 of the management apparatus 1).

The identification of further constructs C2 related to requested construct C1 may be performed based on link data for all check-in procedures performed during the lifetime of the software system. Since the dependencies between constructs may change during the development of the software system, the analysis of related constructs may be limited to a predetermined number of previous check-in procedures or to check-in procedures during a predetermined time period.

Figure 3:
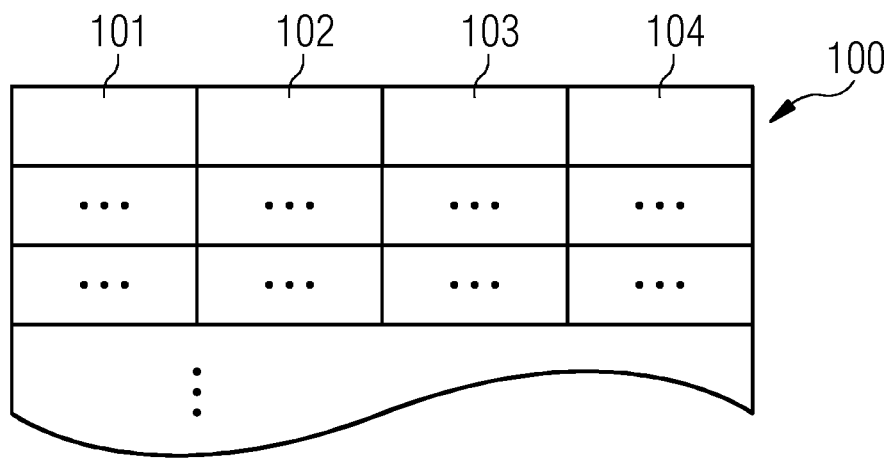
FIG. 3 shows a data structure of link data stored in a database according to an exemplary embodiment.

FIG. 3 illustrates an example of data structure 100 for storing link data in the database 13. For example, link data may be stored in a table including a first column 101 for storing an identification number of the respective check-in procedure, a second column 102 for specifying the constructs that have been checked-in together in this check-in procedure, a third column 103 including a time stamp (e.g., date, time), and further columns 104 for specifying additional information related with each check-in. In this way, identifying device 15 may easily read out link data from database 13 and compute the desired values specifying a relationship between a requested construct C1 and further constructs C2 stored in the memory 12.

Figure 4:
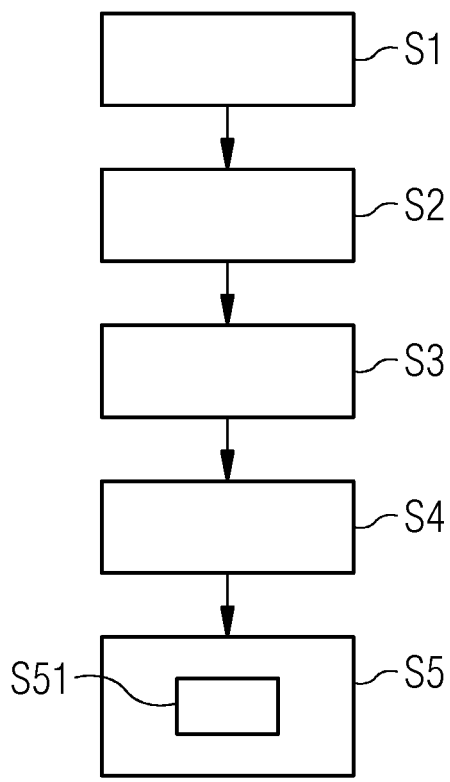
FIG. 4 shows a method for managing data elements according to an exemplary embodiment.

FIG. 4 schematically illustrates one embodiment of a method for managing a plurality of constructs of a code base of a software system. In act 51, a plurality of constructs $C_A$, $C_B$ and $C_C$ are received and stored in act S2 in the memory

12. Additionally, the plurality of constructs $C_A$, $C_B$ and $C_C$ are identified, and link data is generated specifying all constructs $C_A$, $C_B$ and $C_C$ that have been received together. For example, the constructs $C_A$, $C_B$ and $C_C$ that have been received together may be determined by constructs for a common check-in procedure by the management system 1, or by constructs that have been received within a predetermined time period. Other terms for determining whether the received constructs are received together may also be provided. Link data may further include a time stamp (e.g., date and time) and possible additional information about modifications performed in the constructs. For example, if available, an indication about a solved bug or an implemented additional feature may also be specified by the link data.

When a user intends to perform a further modification in the code base, the user sends a request for reading at least one construct to the management system 1. This request is received in act S4, and it is checked whether at least one further constructs that is related with the requested construct exists. For this purpose, in act S5, the link data stored in the database 13 is analyzed in order to identify further constructs related with the requested construct.

For example, in act S51, a statistical value may be calculated between constructs stored in the memory 12 based on the link data recorded in the database 13. For example, a frequency of common check-in procedures of the requested construct and further constructs may be computed. This frequency may be limited to a predetermined number of check-in operations (e.g., to a predetermined number of check-in operations relating to the requested construct). Additionally or alternatively, the analysis may be limited to a predetermined time period. For example, the analysis may be limited to check-in operations that are performed after a particular milestone or another event during the development of the software system.

In this way, potential semantic relations between constructs (e.g., code parts) may be resolved by investigating changes over the evolution of the software system. For each check-in operation, the management system captures a set of constructs that have been changed in common by a particular check-in. By analyzing the frequency of common changes between two constructs, a good indicator of a potential semantic relationship between the two constructs may be determined. This analysis of related constructs will be provided to a user as a list of related constructs in decreasing order or by listing only constructs with a related frequency level over a particular value.

The result of such an analysis is an estimation of two constructs that have been changed in common with a high probability. For each requested construct, a user gets an indication of other constructs that have been often changed together with the requested construct. In one embodiment, only a single check-in procedure may be considered, or the analysis of changes to semantically related constructs may be spread over a plurality of subsequent check-in procedures. Thus, a computed frequency value may consider and contain not only the constructs that have been changed in common by a single check-in, but may also include the constructs from a plurality of subsequent and/or previous check-in procedures or by previous or next check-ins within a certain time frame of the single check-in under consideration.

An estimation of a frequency level of related constructs may be statistically tested within a certain confidence interval by separating the respective set of check-in procedures of changes to a construct into an estimation and a test set. Such a testing of frequency values may be used as an alternative to computing the frequency values based on threshold values when deciding whether or not the determination of further constructs is a valid indicator.

The present embodiments provide an apparatus and a method for identifying possible semantic relationships between code constructs of a software system to by changed in common when evolving the software system. For this purpose, the history and the evolution of the system are analyzed, and how constructs have been changed in common over time is determined.

A high frequency value between two constructs is considered for any change impact analysis when changing one of the two constructs. Change of a first construct implies a change of the other construct with a high probability and vice versa. In addition, if constructs may be associated by any traceability mechanism to the requirements or features or any other issues, a change impact analysis may be provided on functional or non-functional requirements or features. If a construct is changed, not only a determination of potentially affected requirements or features of the changed construct may be provided. Indirectly affected features or requirements due to necessary changes of another construct may also be determined.

The present embodiments relate to an apparatus and a method for identifying relationships between data elements stored in a storage system. For this purpose, a common check-in procedure of related data elements is analyzed, and an additional database is provided for storing information of data elements that have been checked-in together. Based on an analysis of information stored in the additional database, an indication may be automatically generated and provided to a user in order to give a hint for related data elements.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A management apparatus for managing a plurality of data elements of a code base of a software system, the management apparatus comprising:

a receiver configured to receive a plurality of data elements;

a memory configured to store the plurality of received data elements;

a database configured to record link data specifying data elements that have been received together by the receiver;

a requesting device configured to receive a request for reading a requested data element being stored in the memory;

a computing device configured to calculate a statistical value indicating a relationship between the plurality of data elements stored in the memory based on the link data recorded in the database; and an identifying device configured to identify a further data element related with the requested data element based on the link data stored in the database, based on the calculated statistical value, and when a calculated frequency value between the requested data element and the further data element exceeds a predetermined threshold value, the calculated statistical value being a frequency of commonly received data elements, wherein the identifying device comprises the computing device.

2. The management apparatus of claim 1, wherein the database is further configured to record an indication specifying the data elements that have been received together.

3. The management apparatus of claim 1, wherein the database is further configured to record a time stamp of each data element of the plurality of data elements received by the receiver.

4. The management apparatus of claim 1, further comprising a messaging device configured to provide an indication of the identified further data element.

5. The management apparatus of claim 1, wherein the identifying device is configured to identify the further data element based on the link data relating to a predetermined number of previous, next, or previous and next storing operations of received data elements.

6. The management apparatus of claim 1, wherein the identification of the further data element comprises identification of the further data element based on the link data relating to the storing of received data elements within a predetermined time period.

7. The management apparatus of claim 1, wherein the plurality of data elements comprises a set of Files, Directories, Sub-Directories, Namespaces, Classes, or Class methods/functions.

8. A data storage and management system, comprising:
a management apparatus for managing a plurality of data elements of a code base of a software system, the management apparatus comprising:
 a receiver configured to receive the plurality of data elements;
 a memory configured to store the plurality of received data elements;
 a database configured to record link data specifying data elements that have been received together by the receiver;
 a requesting device configured to receive a request for reading a requested data element being stored in the memory;
 a computing device configured to calculate a statistical value indicating a relationship between the plurality of data elements stored in the memory based on the link data recorded in the database; and
 an identifying device that includes the computing device, the identifying device being configured to identify a further data element related with the requested data element based on the link data stored in the database, based on the calculated statistical value, and when a calculated frequency value between the requested data element and the further data element exceeds a predetermined threshold value, the calculated statistical value being a frequency of commonly received data elements; and
a user terminal configured to send a data element to the management apparatus and to receive a data element from the management apparatus upon request.

9. A method for managing a plurality of data elements of a code base of a software system, the method comprising:
receiving a plurality of data elements;
storing the plurality of received data elements in a memory;
recording link data in a database, the link data specifying data elements that have been received together;
receiving a request for reading a requested data element stored in the memory;
calculating a statistical value indicating a relationship between the plurality of data elements stored in the memory based on the link data recorded in the database; and
identifying a further data element related with the requested data element based on the link data stored in the database, based on the calculated statistical value, and when a computed frequency value between the requested data element and the further data element exceeds a predetermined threshold value,
wherein the calculated statistical value is a frequency of commonly received data elements.

10. The method of claim 9, wherein the identifying comprises identifying the further data element based on the link data relating to a predetermined number of previous, next, or previous and next storing operations of received data elements.

11. The method of claim 9, wherein the identifying comprises identifying the further data element based on the link data relating to storing of received data elements within a predetermined time period.

12. The method of claim 9, wherein the plurality of data elements comprises a set of Files, Directories, Sub-Directories, Namespaces, Classes or Class methods/functions.

13. A method for managing a plurality of data elements of a code base of a software system, the method comprising:
receiving a plurality of data elements;
storing the plurality of received data elements in a memory;
recording link data in a database, the link data specifying data elements that have been received together;
receiving a request for reading a requested data element stored in the memory;
calculating a statistical value indicating a relationship between the plurality of data elements stored in the memory based on the link data recorded in the database; and
identifying a further data element related with the requested data element based on the link data stored in the database, based on the calculated statistical value, and when a computed frequency value is within a predetermined confidence interval,
wherein the calculated statistical value is a frequency of commonly received data elements.

14. The method of claim 13, wherein the identifying comprises identifying the further data element based on the link data relating to a predetermined number of previous, next, or previous and next storing operations of received data elements.

15. The method of claim 13, wherein the identifying comprises identifying the further data element based on the link data relating to storing of received data elements within a predetermined time period.

16. The method of claim 13, wherein the plurality of data elements comprises a set of Files, Directories, Sub-Directories, Namespaces, Classes or Class methods/functions.

17. A management apparatus for managing a plurality of data elements of a code base of a software system, the management apparatus comprising:
- a receiver configured to receive a plurality of data elements;
- a memory configured to store the plurality of received data elements;
- a database configured to record link data specifying data elements that have been received together by the receiver;
- a requesting device configured to receive a request for reading a requested data element being stored in the memory;
- a computing device configured to calculate a statistical value indicating a relationship between the plurality of data elements stored in the memory based on the link data recorded in the database; and
- an identifying device configured to identify a further data element related with the requested data element based on the link data stored in the database, based on the calculated statistical value, and when a computed frequency value is within a predetermined confidence interval, the calculated statistical value being a frequency of commonly received data elements,
- wherein the identifying device comprises the computing device.

18. The management apparatus of claim 17, wherein the database is further configured to record an indication specifying the data elements that have been received together.

19. The management apparatus of claim 17, wherein the database is further configured to record a time stamp of each data element of the plurality of data elements received by the receiver.

20. The management apparatus of claim 17, further comprising a messaging device configured to provide an indication of the identified further data element.

21. The management apparatus of claim 17, wherein the identifying device is configured to identify the further data element based on the link data relating to a predetermined number of previous, next, or previous and next storing operations of received data elements.

22. The management apparatus of claim 17, wherein the identification of the further data element comprises identification of the further data element based on the link data relating to the storing of received data elements within a predetermined time period.

23. The management apparatus of claim 17, wherein the plurality of data elements comprises a set of Files, Directories, Sub-Directories, Namespaces, Classes, or Class methods/functions.

24. A data storage and management system, comprising:
- a management apparatus for managing a plurality of data elements of a code base of a software system, the management apparatus comprising:
  - a receiver configured to receive the plurality of data elements;
  - a memory configured to store the plurality of received data elements;
  - a database configured to record link data specifying data elements that have been received together by the receiver;
  - a requesting device configured to receive a request for reading a requested data element being stored in the memory;
  - a computing device configured to calculate a statistical value indicating a relationship between the plurality of data elements stored in the memory based on the link data recorded in the database; and
  - an identifying device that includes the computing device, the identifying device being configured to identify a further data element related with the requested data element based on the link data stored in the database, based on the calculated statistical value, and when a computed frequency value is within a predetermined confidence interval, the calculated statistical value being a frequency of commonly received data elements; and
- a user terminal configured to send a data element to the management apparatus and to receive a data element from the management apparatus upon request.

25. A computer program product for managing a plurality of data elements of a code base of a software system, the computer program product comprising:
- a non-transitory computer-readable storage medium storing computer-readable program instructions, the computer-readable program instructions being executable by a processor to:
  - receive a plurality of data elements;
  - store the plurality of received data elements in a memory;
  - record link data in a database, the link data specifying data elements that have been received together;
  - receive a request for reading a requested data element stored in the memory;
  - calculate a statistical value indicating a relationship between the plurality of data elements stored in the memory based on the link data recorded in the database; and
  - identify a further data element related with the requested data element based on the link data stored in the database, based on the calculated statistical value, and when a computed frequency value between the requested data element and the further data element exceeds a predetermined threshold value,
- wherein the calculated statistical value is a frequency of commonly received data elements.

26. A computer program product for managing a plurality of data elements of a code base of a software system, the computer program product comprising:
- a non-transitory computer-readable storage medium storing computer-readable program instructions, the computer-readable program instructions being executable by a processor to:
- receive a plurality of data elements;
- store the plurality of received data elements in a memory;
- record link data in a database, the link data specifying data elements that have been receive together;
- receive a request for reading a requested data element stored in the memory;
- calculate a statistical value indicating a relationship between the plurality of data elements stored in the memory based on the link data recorded in the database; and
- identify a further data element related with the requested data element based on the link data stored in the database, based on the calculated statistical value, and when the computed frequency value is within a predetermined confidence interval,
- wherein the calculated statistical value is a frequency of commonly received data elements.

* * * * *